(12) United States Patent
Tajima

(10) Patent No.: US 6,550,612 B2
(45) Date of Patent: Apr. 22, 2003

(54) DISC HOLDING APPARATUS

(76) Inventor: Minoru Tajima, 3-5-16, Ojima, Honjo-shi, Saitama 367-0061 (JP)

( * ) Notice: Subject to any disclaimer, the term of this patent is extended or adjusted under 35 U.S.C. 154(b) by 0 days.

(21) Appl. No.: 09/867,755

(22) Filed: May 31, 2001

(65) Prior Publication Data

US 2002/0162760 A1 Nov. 7, 2002

(30) Foreign Application Priority Data

May 1, 2001 (JP) ........................................ 2001-134216

(51) Int. Cl.⁷ .............................................. B65D 85/57
(52) U.S. Cl. ................................... 206/310; 206/308.1
(58) Field of Search ............................ 206/309, 308.1, 206/310, 312, 493

(56) References Cited

U.S. PATENT DOCUMENTS 6,041,923 A * 3/2000 Furutsu ................... 206/308.1
6,123,192 A * 9/2000 Rufo, Jr. .................. 206/308.1
6,293,396 B1 * 9/2001 Takahashi et al. ........ 206/308.1
2001/0021167 A1 * 9/2001 Kutaragi et al. ............ 369/291

* cited by examiner

*Primary Examiner*—David T. Fidei
(74) *Attorney, Agent, or Firm*—Armstrong, Westerman & Hattori, LLP (57) ABSTRACT

An object of the invention is to provide a disc holding apparatus which can securely hold an information recording disc and effectively prevent a breakage from being generated at a time of being taken out. In a disc holding apparatus provided within a main body and provided for holding an information recording disc, the disc holding apparatus is provided with a holding body protruded from the main body by a supporting line having an elasticity, provided so as to move close to and apart from the main body and engaging with a center hole of the disc in such a manner as to put in and take out with respect to an inner portion of the center hole, and a disc receiving portion for receiving the disc is provided so as to protrude from the main body at a time when the holding body moves close to a side of the main body, in an outer side of the holding body.

6 Claims, 7 Drawing Sheets

DISC HOLDING APPARATUS

BACKGROUND OF THE INVENTION

The present invention relates to a disc holding apparatus which can easily put in and take out a magneto-optical disc such as a compact disc (CD), a digital versatile disc (DVD) or the like and securely hold the disc.

In conventional, the magneto-optical disc such as the CD, the CD-R or the like is used as a recording medium for recording an information such as a music, a screen image and the like, a software or the like. In the case of circulating the magneto-optical disc such as the CD, the CD-R or the like on which the information mentioned above is recorded, on the market, the recorded information can not be read out when the magneto-optical disc is damaged. Accordingly, in order to protect the recorded information, the magneto-optical disc is provided on the circulation market in a state of being received within a receiving case made of a synthetic resin such as a plastic or the like.

Further, in recent year, an amount of data information of the information such as the music, the screen image and the like, the software or the like is increased, and a plurality of magneto-optical discs such as the CDs, the CD-Rs or the like are frequently used for providing the information mentioned above. Accordingly, there has been provided a digital versatile disc (DVD) as a magneto-optical disc corresponding to a high density recording medium capable of recording a large amount information only by one disc. The DVD is structured such as to read and write on both surfaces (there is a case that reading can be only executed), however, a shape, a thickness and the like thereof are structured such as to be substantially the same as those of the magneto-optical disc such as the CD, the CD-R or the like mentioned above, and a case for receiving the DVD has substantially the same shape as that of the case for receiving the magneto-optical disc such as the CD, the CD-R, or the like.

In the case of holding the CD, the CD-R or the like within the receiving case, an independent main body is provided within the receiving case, and a holding body (a lock hook) having an elasticity capable of holding a center hole of the CD, the CD-R or the like is provided in substantially center of the main body. In this case, when pressing the center hole provided in the center of the CD, the CD-R or the like to the holding body, the holding body is temporarily deflected inside the center hole so as to be compressed and thereafter returned. Accordingly, the CD, the CD-R or the like is held by the holding body. Further, in the case of taking out the CD, the CD-R or the like held by the holding body within the main body, the CD, the CD-R or the like is taken out by forcibly lifting up an outer periphery of the CD, the CD-R or the like so as to pick off from the holding body.

Further, the high density information is recorded on the DVD, and when a scratch, a fat of fingers or the like is attached to a surface of the DVD, there is generated a trouble that the data (the high density information) is hard to be read out. Accordingly, in order to prevent the trouble from being generated at a time of reading out the data recorded on the DVD, a method of attaching and detaching the DVD with respect to the CD, the CD-R or the like is changed by modifying the structure of the holding body provided within the main body. In this case, the structure is made such that the DVD can be easily attached to and detached from the holding body without handling the surface of the DVD for protecting the data of the high density information.

That is, the holding body for holding the DVD is provided, for example, so as to protrude to a center of the main body, whereby the center portion is vertically separated into two parts, and a lower side of the holding body extends to both side portions so as to be supported by a supporting line having an elasticity. A projection wider (having a larger diameter) than the center hole provided in the DVD is provided in each of two-sectioned parts of the holding body. The projections move close to each other due to the deflection of the supporting line, the holding body or the like when the holding body is pressed to the main body side so as to be brought into contact with the center hole. Then, the projections are compressed by the center hole so as to pass through the center hole of the DVD.

Further, when the two-sectioned parts of the holding body are pressed to a side of the main body, the holding body moves to the side of the main body due to the deflection of the supporting line, whereby both of the projections are moved close to each other by the center hole provided in the DVD. Both of the projections are compressed by the center hole of the DVD due to the pressing mentioned above, and pass through the inner portion of the center hole of the DVD and come out upward due to an elastic return of the supporting line. Accordingly, both of the projections move apart from each other in an upper side of the center hole of the DVD, so that the DVD is held by the holding body (the main body).

Further, in the case of taking out the DVD from the case, the holding body is pressed to the side of the main body so as to move the holding body close to the main body. Accordingly, when the holding body moves close to the side of the main body, both of the projections are compressed, and when the holding body is further pressed, the supporting line and the holding body is deflected, and then both of the projections are compressed to be smaller than the center hole. Therefore, both of the projections pass through the center hole of the DVD. When both of the projections pass through the center hole of the DVD, the supporting line and the holding body are elastically returned and both of the projections are expanded to be larger than the center hole of the DVD, so that if the fingers pressing the holding body is taken off thereafter, the DVD moves apart from the main body due to the elastic return of both portions of the holding body, whereby the DVD can be taken out.

However, in the case of taking out the DVD held in the holding body provided in the main body, if only one of the two-sectioned parts of the holding body provided in the main body is pressed to the side of the main body, another part of the holding body can not be compressed to be smaller than the center hole of the DVD. Accordingly, there is a problem that the DVD can be taken out from the main body only by simultaneously moving both of the two-sectioned parts of the holding body close to the side of the main body.

Further, the DVD is held by the holding body having the center portion vertically sectioned into two parts and deflected due to the elasticity, however, in the case that the supporting line and the holding body are easily deflected, it is impossible to securely hold the DVD in the holding body, and the DVD is taken off from the holding body within the case, whereby the data surface is scratched due to a movement of the DVD. For this reason, since the supporting line and the holding body are structured such as to have a high strength and be hard to be deflected, the center hole is firmly held by the holding body. In this case, since the DVD is held by the disc receiver on the outer periphery of the DVD, there is a serious problem that the DVD is deformed and broken.

SUMMARY OF THE INVENTION

The present invention is made in order to solve the problems in the conventional art mentioned above, and an object of the present invention is to provide a disc holding apparatus which can securely hold an information recording disc such as a DVD, a CD, a CD-R or the like and effectively prevent a breakage from being generated at a time of being taken out.

That is, in accordance with the present invention, there is provided a disc holding apparatus provided within a main body and provided for holding an information recording disc, comprising:

a holding body protruded from the main body by a supporting line having an elasticity, provided so as to move close to and apart from the main body and engaging with a center hole of the disc in such a manner as to put in and take out with respect to an inner portion of the center hole, wherein a disc receiving portion for receiving the disc is provided so as to protrude from the main body at a time when the holding body moves close to a side of the main body, in an outer side of the holding body.

Further, in accordance with the present invention, there is provided a disc holding apparatus as recited above, wherein the supporting line is provided at a plurality of portions, and at least one of the supporting lines has a strength lower than a strength of the other supporting lines.

Further, in accordance with another aspect of the present invention, there is provided a disc holding apparatus comprising:

a main body; and a holding body provided within the main body for holding an information recording disc, protruded from the main body by a supporting line having an elasticity, provided so as to move close to and apart from the main body and engaging with a center hole of the disc in such a manner as to put in and take out with respect to an inner portion of the center hole, wherein the supporting line is provided at a plurality of portions, and at least one of the supporting lines has a strength lower than a strength of the other supporting lines.

Further, in accordance with the present invention, there is provided a disc holding apparatus as recited in each of the aspects mentioned above, wherein the supporting line is provided at three portions, three supporting lines extend radially around the holding body in three directions at a substantially uniform interval, and at least one of the supporting lines has a strength lower than a strength of the other two supporting lines.

Further, in accordance with the present invention, there is provided a disc holding apparatus as recited in each of the aspects mentioned above, wherein the supporting line having the lower strength is structured such that a width or a thickness thereof is smaller than that of the other supporting lines.

Further, in accordance with the present invention, there is provided a disc holding apparatus as recited in each of the aspects mentioned above, wherein the holding body has a disc holding line protruding outward and having an elasticity, the disc holding line is engaged with an edge portion of the center hole in a side opposite to the main body in a state that the holding body is inserted into the center hole of the disc in such a manner as to freely engage and disengage, and is deformed in such a manner as to be compressed inward when the holding body is pressed so as to move close to the main body, thereby allowing the holding body to pass through the center hole.

DETAILED DESCRIPTION OF THE PREFERRED EMBODIMENT

Figure 1:
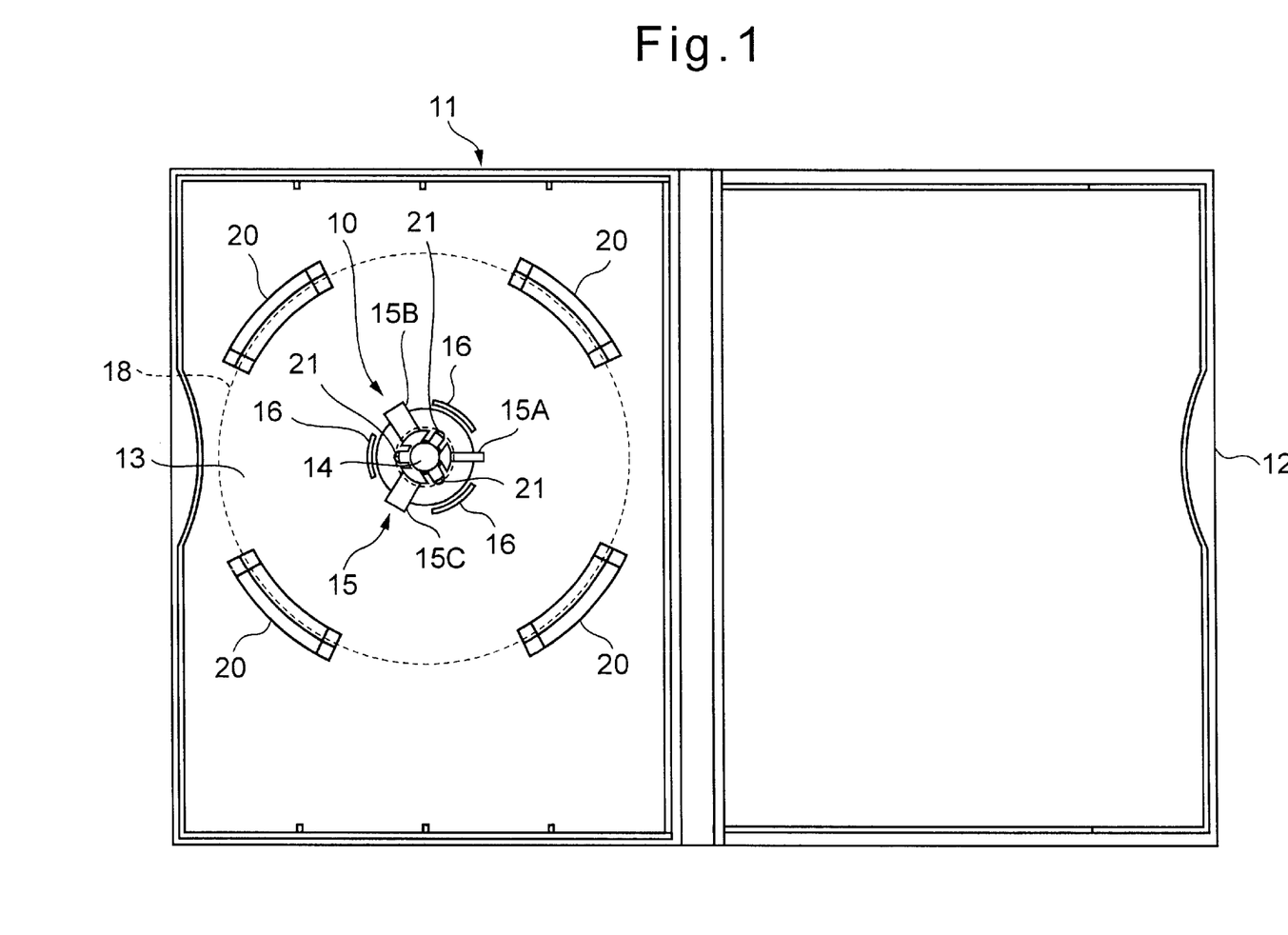
FIG. 1 is a plan view of a receiving case, showing a state that a disc is held in a disc holding apparatus in accordance with the present invention.
Figure 2:
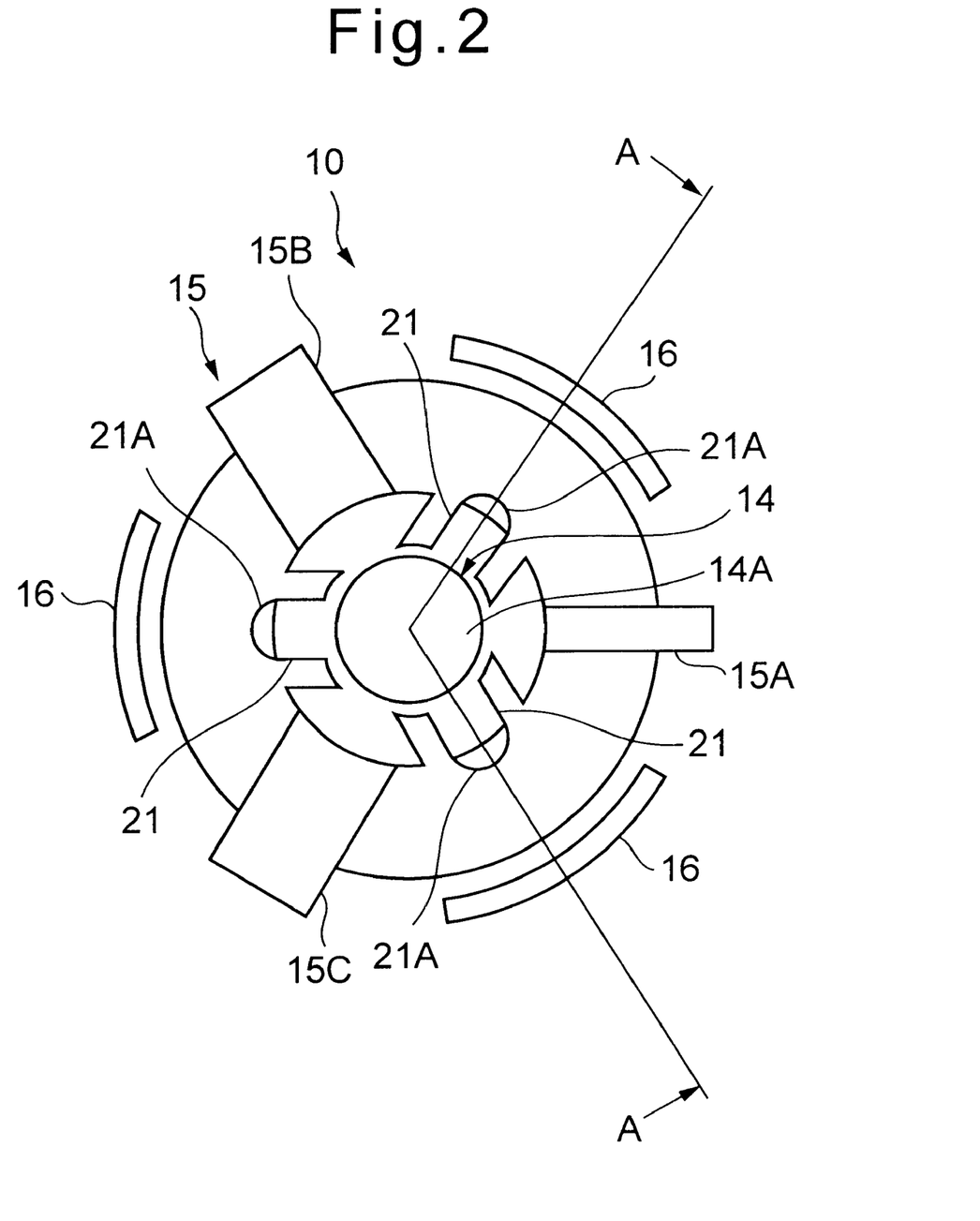
FIG. 2 is an enlarged plan view of the disc holding apparatus in accordance with the present invention.

Next, a description will be given in detail of an embodiment in accordance with the present invention with reference to the accompanying drawings. In FIGS. 1 and 2, reference numeral 11 denotes a receiving case in which an information recording disc 18 such as a DVD or the like is received. The receiving case 11 is made of a synthetic resin such as an ABS resin, a plastic or the like, and is constituted by a casing having a vertical length about 190 mm, a lateral length about 142 mm and a thickness about 14 mm. The receiving case 11 is constituted by a main body 13 and a lid 12 pivoted to one side of the main body 13 in such a manner as to be freely opened and closed, and is structured such as to hold the disc 18 in a state that the disc 18 is received within the case. In this case, the information recording disc 18 such as the DVD or the like already comes onto the market, and a detailed description thereof will be omitted.

A holding body 14 is provided in a substantially center of the main body 13 provided within the receiving case 11 so as to protrude to the lid 12, and the holding body 14 is integrally formed with the main body 13 via a supporting line 15 having an elasticity and a predetermined width. The holding body 14 is formed so that a height is about 3.5 mm and a diameter of an outer shape is about 15 mm, and the supporting lines 15 are radially extended to a side of the main body 13 of the holding body 14. The main body 13, the supporting lines 15 and the holding body 14 are integrally formed. The holding body 14 is provided so as to be positioned in a side of the lid 12 of the main body 13, and the holding body 14 is formed so as to be a little apart from the main body 13. Further, a substantially circular pressing portion 14A for pressing the holding body 14 to the side of the main body 13 is provided in a center of the holding body 14, and the pressing portion 14A is formed at a position having a diameter smaller than that of the holding body 14 and protrudes a little to the side apart from the main body 13.

Further, the holding body 14 is structured such as to be engaged with and disengaged from the side of the main body 13 due to an elasticity of the supporting line 15. That is, the holding body 14 is provided in a state of being a little apart from the main body 13 and close to the side of the lid 12 by the supporting lines 15, and is structured such that in the case that the holding body 14 is pressed to the side of the main body 13, the holding body 14 moves close to the side of the main body 13 due to the elasticity of the supporting lines 15, and in the case that the pressing force is cancelled, the holding body 14 moves apart from the main body 13 at a predetermined distance.

The supporting lines 15 are provided at three portions (in this case, the supporting liens 15A, 15B and 15C) in the periphery of the holding body 14. Then, these three supporting lines 15A, 15B and 15C radially extend at a predetermined distance in three directions around the holding body 14 at a substantially uniform interval. A strength of any one supporting line (in this case, the supporting line 15A) of three supporting lines 15A, 15B and 15C mentioned above is made lower than a strength of the other two supporting lines 15B and 15C. That is, the supporting line 15A having the lower strength among the supporting lines 15A, 15B and 15C at three portions is structured such as to be narrower than the other two supporting lines 15B and 15C so as to reduce a deflection strength. In this case, the structure may be made such that each of the supporting lines 15A, 15B and 15C have substantially the same shape and the deflection strength of the supporting line 15A is made lower than the other two supporting lines 15B and 15C by making only a thickness of the supporting line 15A thin or changing only a length of the supporting line 15A.

Further, a disc holding line 21 formed to have a width of about 4 mm and having an elasticity is formed on a peripheral side surface of the holding body 14 so as to protrude outward, and the disc holding line 21 is provided at a substantially middle position of each of the supporting lines 15A, 15B and 15C. Each of the disc holding lines 21 extends at a predetermined distance from a periphery of the pressing portion 14A of the holding body 14, is thereafter bent to the side of the main body 13 and extends at a predetermined distance. These disc holding lines 21 are integrally formed with the holding body 14, and is slightly expanded from the holding body 14 as being extended in a direction of the main body 13. Further, an engaging portion 21A is provided in each of the disc holding lines 21, and the engaging portion 21A protrudes at a predetermined distance from an outer surface (in this case, an apart side of the pressing portion 14A) of the disc holding line 21 and is inclined in a direction of compressing the side of the main body 13.

That is, the engaging portion 21A is positioned on the outer surface of the disc holding line 21 and integrally formed with the disc holding line 21. Further, a peripheral portion (including the disc holding line 21) of each of the disc holding lines 21 in the side of the holding body 14 is formed so as to have a diameter a little smaller than that of a center hole 18A of the disc 18, and the engaging portion 21A having a diameter a little larger than that of the center hole 18A of the disc 18 is provided in each of the disc holding lines 21 in such a manner as to protrude to the apart side of the pressing portion 14A. Further, a lower end of the disc holding line 21 corresponding to the main body 13 side is expanded so as to have a diameter a little larger than that of the center hole 18A of the disc 18.

The disc holding line 21 is structured such as to be engaged with an edge portion of the center hole 18A in an opposite side to the main body 13 so as to freely engage therewith and disengage therefrom, in a state that the holding body 14 is inserted within the center hole 18A of the disc 18. Accordingly, the structure is made such that when the holding body 14 is pressed in a direction of moving close to the main body 13, the disc holding line 21 is deformed inward so as to be compressed by the engaging portion 21A being brought into contact with the center hole 18A, whereby the engaging portion 21A (the holding body 14) passes through the inner portion of the center hole 18A.

Further, the disc receiving portion 16 is provided close to the outer periphery of the holding body 14 with a predetermined interval, the disc receiving portion 16 is provided so as to protrude out to the side of the lid 12 from the main body 13 at a predetermined distance, and the disc receiving portion 16 is provided in a circular arc shape around the holding body 14. Then, the disc receiving portion 16 is provided at each of positions between the respective supporting lines 15A, 15B and 15C, and is provided with a predetermined interval between each of the disc receiving portions 16 and each of the supporting lines 15A, 15B and 15C. The disc receiving portion 16 mentioned above is structured such as to have a height at which the disc receiving portion 16 is substantially brought into contact with the disc 18 in a state that the center hole 18A of the disc 18 is held in the holding body 14.

That is, the disc receiving portion 16 is provided for receiving a portion near the center hole 18A of the disc 18, and is structured such that the engaging portion 21A is engaged with the edge portion of the center hole 18A in an opposite side to the main body 13 in a state that the portion near the center hole 18A of the disc 18 is brought into contact with the disc receiving portion 16. Then, the disc 18 is brought into contact with the disc receiving portion 16 and the engaging portion 21A is engaged with the edge portion of the center hole 18A in the apart side from the disc receiving portion 16, whereby the disc 18 is held by the disc holding apparatus 10. In this case, reference numeral 20 denotes a disc receiver structured such as to have substantially the same height as that of the disc receiving portion 16. The structure is made such that the outer peripheral portion of the disc 18 is supported to the disc receiver 20, whereby the disc 18 is stably held by the holding body 14 without being inclined.

Figure 3:
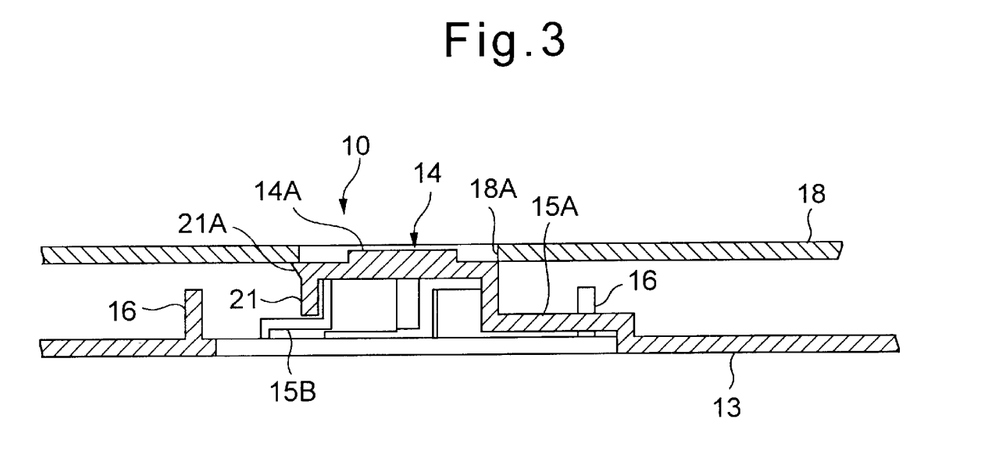
FIG. 3 is a side elevational view of the disc holding apparatus, showing a state before a disc is inserted and attached to a holding body.

Further, after the center hole 18A of the disc 18 is aligned with the holding body 14, the disc 18 is pressed to the side of the main body 13 (FIG. 3). Accordingly, the holding body 14 is deflected due to an elasticity of the supporting lines 15 so as to move close to the main body 13, however, at this time, since the strength of one supporting line 15A is made lower than the strength of the other supporting lines 15B and 15C, the supporting line 15A having the low strength is first deflected and the pressing force of the holding body 14 is dispersed into the supporting lines 15B and 15C and the supporting line 15A. Accordingly, the holding body 14 can be easily inserted into the center hole 18A of the disc 18 in accordance with a light pressing operation.

Figure 4:
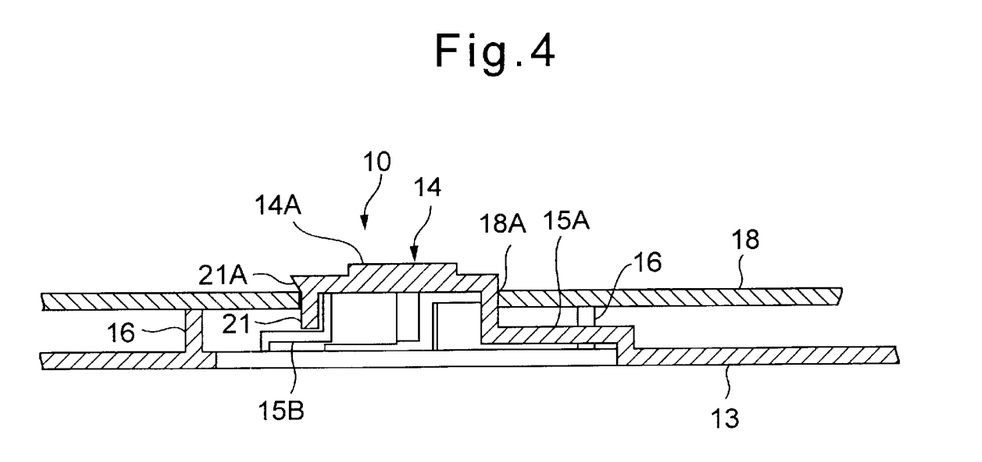
FIG. 4 is a side elevational view of the disc holding apparatus, showing a state that the disc is inserted and attached to the holding body.

Further, when each of the engaging portions 21A provided in the holding body 14 is deflected due to the elasticity so as to pass through the inner portion of the center hole 18A of the disc 18 and reach the apart side of the main body 13, the disc 18 is brought into contact with the disc receiving portion 16 so as to be prevented from moving closer to the side of the main body 13 and then stop there. When the disc 18 is brought into contact with the disc receiving portion 16 and each of the engaging portions 21A passes through the inner portion of the center hole 18A so as to move to the apart side of the main body 13, the supporting lines 15 return to an initial position (a position having the diameter larger than an inner diameter of the center hole 18A) due to the elasticity (FIG. 4).

Accordingly, each of the engaging portions 21A provided in the holding body 14 is positioned at the side apart from the main body 13 in the center hole 18A, whereby the disc 18 is securely held between each of the engaging portions 21A and the disc holding portion 16. That is, the supporting line 15A having the low strength is deflected only by pressing the center hole 18A of the disc 18 to the side of the main body 13 in correspondence to the holding body 14. Accordingly, sine the pressing force of the holding body 14 is dispersed, the disc 18 can be held to the disc holding apparatus 10 by a light pressing force.

Figure 5:
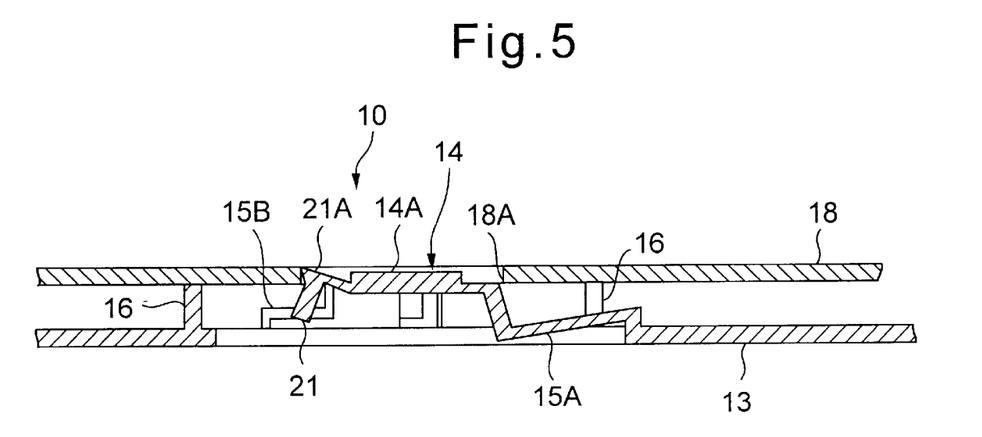
FIG. 5 is a side elevational view of the disc holding apparatus, showing a state that the holding body is pressed to a side of a main body and one supporting line having a low strength among three supporting lines is deflected.

On the contrary, in the case of taking out the disc 18 (FIG. 4) held by the disc holding apparatus 10, the pressing portion 14A provided in a substantially center of the holding body 14 protruding from the center hole 18A of the disc 18 is pressed by the fingers to the side of the main body 13. When the holding body 14 is close to the side of the main body 13, each of the engaging portions 21A is engaged with the edge portion of the center hole 18A of the disc 18 corresponding to the opposite side to the main body 13, so that the disc holding line 21 is deflected by the center hole 18A so as to be compressed inward, whereby the engaging portion 21A (the holding body 14) is positioned within the center hole 18A (FIG. 5). Then, since the pressing force of the holding body 14 is dispersed by the supporting line 15A having the lower strength at a time when the engaging portion 21A (the holding body 14) passes through the inner portion of the center hole 18A, the pressing portion 14A moves close to the main body 13 by the light pressing force. In this case, since the disc 18 is not deflected to the side of the main body 13 by the disc receiving portion 16, only the holding body 14 moves close to the side of the main body 13.

Figure 6:
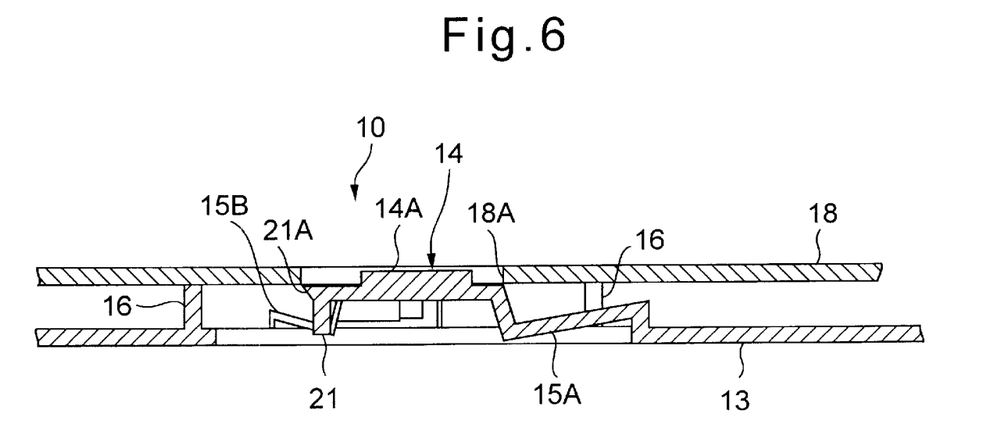
FIG. 6 is a plan view of the disc holding apparatus, showing a state that the holding body is pressed to the side of the main body from a center hole of the disc.

Accordingly, the holding body 14 passes through the inner portion of the center hole 18A of the disc 18, and each of the engaging portions 21A is positioned in the side of the main body 13 of the center hole 18A and expanded so as to be larger than the center hole 18A (FIG. 6). Further, when the fingers are removed from the holding body 14, the disc 18 is supported to each of the engaging portions 21A expanded to be larger than the center hole 18A and lifted upward (to the apart side of the main body 13) as it is in accordance with an elastic return of the supporting line 15 (becomes in a state shown in FIG. 3 of being taken out from the holding body 14). That is, the holding body 14 is only light pressed to the side of the main body 13 so as to be apart from the main body 13, whereby the disc 18 can be moved apart from the disc receiving portion 16 so as to be taken out therefrom.

Figure 7:
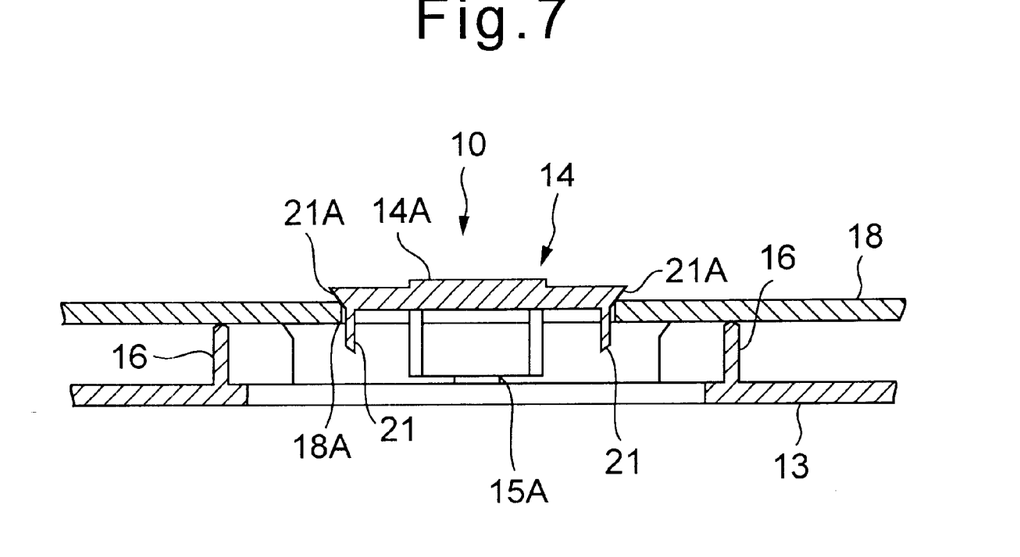
FIG. 7 is a cross sectional view along a line A—A in FIG. 2, showing a state that the disc is held in the holding body.
Figure 8:
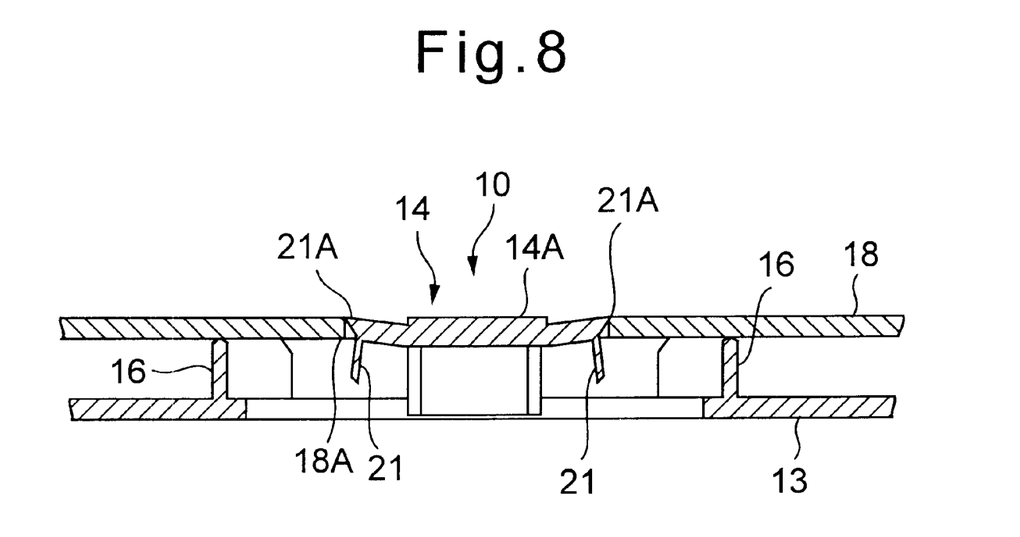
FIG. 8 is a cross sectional view along the line A—A in FIG. 2, showing a state that an engaging portion is compressed and the holding body is inserted into the center hole of the disc.

In this case, a description will be given in detail of an operation of the disc holding line 21 with reference to FIGS. 7 to 10. FIG. 7 shows a state that the center hole 18A of the disc 18 is held in the holding body 14 provided in a substantially center of the main body 13 within the receiving case 11. When the pressing portion 14A is pressed to the side of the main body 13 by the fingers in this state, only the holding body 14 moves to the side of the main body 13 since the portion near the center hole 18A of the disc 18 does not move to the side of the main body 13 any more by the disc receiving portion 16. When the holding body 14 moves to the side of the main body 13 and close thereto, the disc holding line 21 is deformed to the opposite side to the main body 13 and compressed inward from the center hole 18A of the disc 18 since each of the engaging portions 21A is engaged with the edge portion of the center hole 18A in the opposite side to the main body 13 (FIG. 8).

Figure 9:
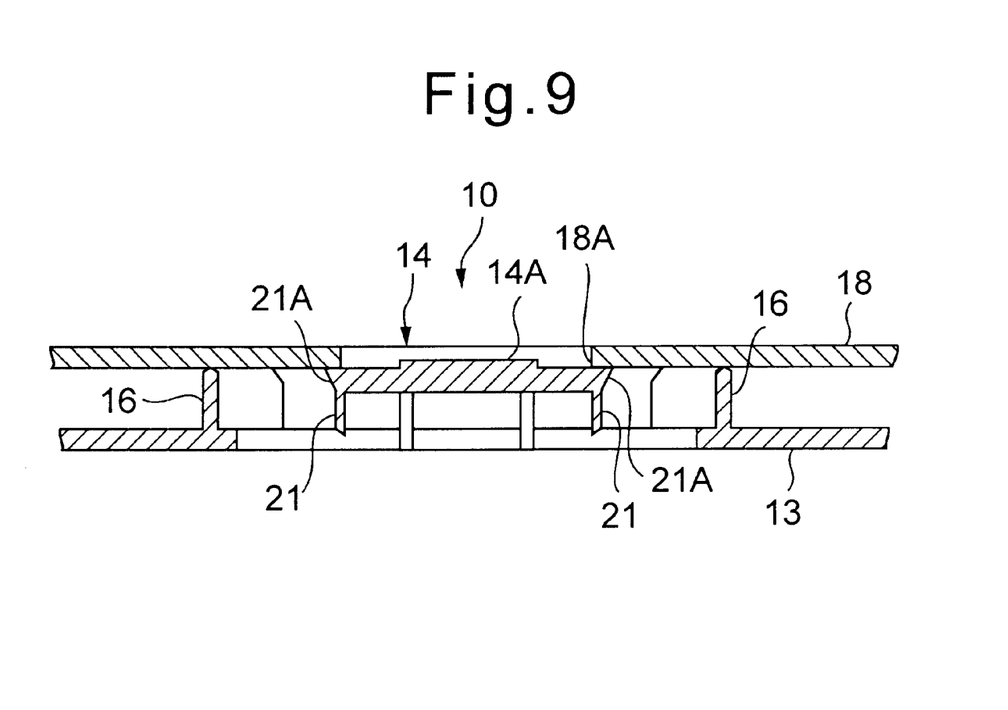
FIG. 9 is a cross sectional view along the line A—A in FIG. 2, showing a state that the engaging portion is expanded in a side of the main body of the center hole of the disc.
Figure 10:
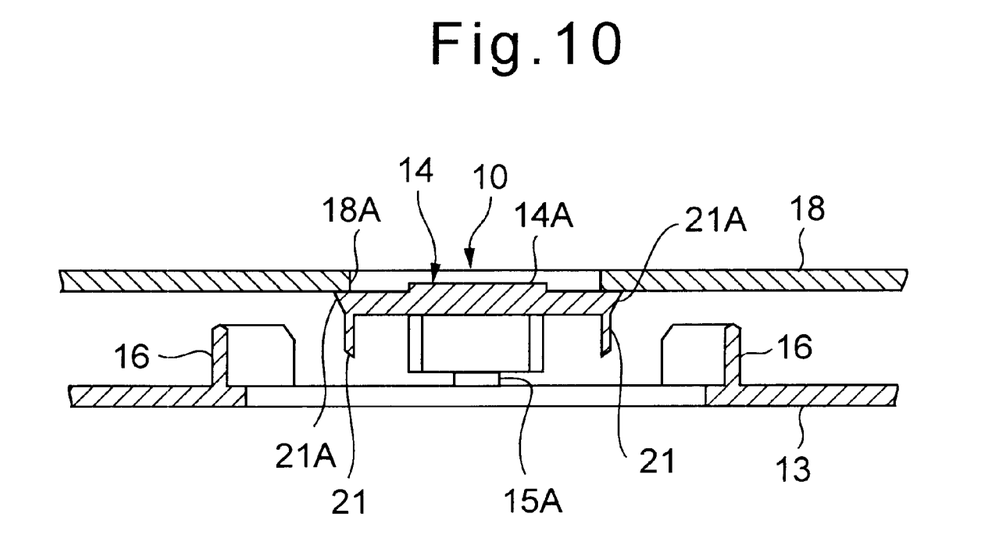
FIG. 10 is a cross sectional view along the line A—A in FIG. 2, showing a state that the disc is lifted up to an apart side of the main body by the expanded engaging portion.

When the holding body 14 further moves to the side of the main body 13 and close thereto, the holding body 14 passes through the inner portion of the center hole 18A and is positioned in the side of the main body 13 of the center hole 18A of the disc 18. Accordingly, the disc holding line 21 comes out from the center hole 18A so as to be elastically returned and expanded to be larger than the inner diameter of the center hole 18A (FIG. 9). When the fingers are removed from the holding body 14, the disc 18 is supported by each of the engaging portions 21A and moves apart from the main body 13 as it is in accordance with an elastic return of the supporting line 15 (FIG. 10). Accordingly, since the disc 18 is positioned on the holding body 14, the disc 18 can be easily taken out from the receiving case 11 without applying a specific force thereto.

As mentioned above, since the supporting lines 15 are radially extended in three directions around the holding body 14 at the uniform interval and any one supporting line 15A of the supporting lines 15 (the supporting lines 15A, 15B and 15C) is structured such as to have the smaller width or the smaller thickness than that of the other two supporting lines 15B and 15C so as to reduce the strength thereof, it is possible to disperse the pressing force of the holding body 14 by one supporting line 15A and two supporting lines 15B and 15C when the holding body 14 is pressed in the direction of moving close to the main body 13.

Accordingly, since it is possible to significantly reduce the pressing force of the holding body 14, it is possible to move the holding body 14 close to the side of the main body 13 from the inner portion of the center hole 18A of the disc 18 only by lightly pressing the holding body 14. Accordingly, it is possible to prevent the disc 18 from being deformed due to the pressing force of the holding body 14, and it is possible to previously prevent the serious problem such that the disc 18 is broken in accordance with the pressing force of the holding body 14 at a time of pressing the holding body 14 so as to take out the holding body 14 from the inner portion of the center hole 18A, or the like.

In particular, since the strength of one supporting line 15A is made lower than that of the other two supporting lines 15B and 15C, it is possible to securely disperse the pressing force of the holding body 14. Accordingly, it is possible to take out the holding body 14 from the inner portion of the center hole 18A of the disc 18 in accordance with a small pressing force. Therefore, it is possible to securely prevent the trouble that the disc 18 is broken due to the pressing force of the holding body 14 at a time of processing the holding body 14 to the side of the main body 13.

Further, since there is provided with the disc receiving portion 16 for receiving the disc 18 at a time when the holding body 14 moves close to the main body 13, it is possible to previously prevent the disc 18 from being warped, for example, which is caused by the outer periphery of the disc 18 being received by the disc receiver in accordance with the prior art, even in the case of pressing the holding body 14 to the side of the main body 13. Accordingly, it is possible to securely prevent the trouble in reading out the information on the disc 1 due to the warp, or the breakage or the like due to the warp.

Figure 11:
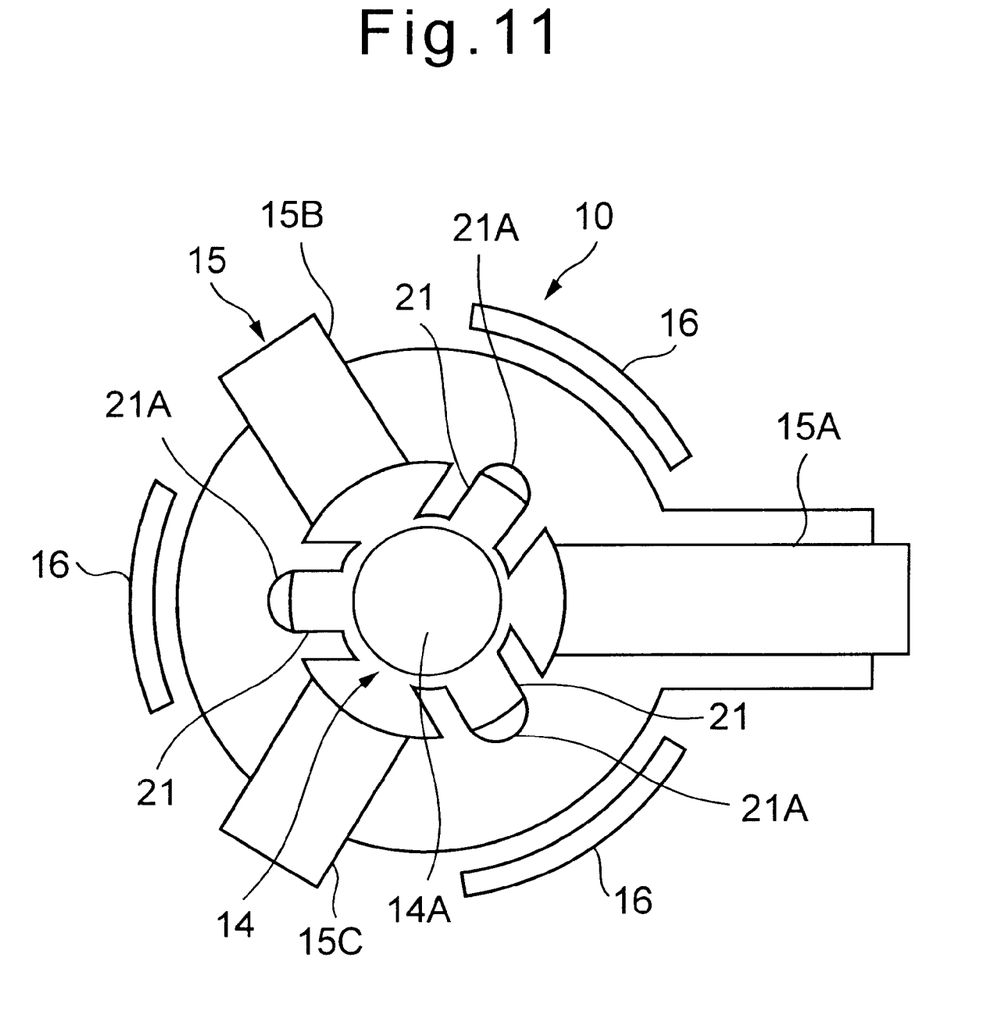
FIG. 11 is an enlarged plan view of another disc holding apparatus in accordance with the present invention.

Next, FIG. 11 shows another disc holding apparatus 10. In this case, the supporting lines 15 are radially extended in three directions around the holding body 14 at a uniform interval and any one supporting line 15A among these supporting lines 15 (the supporting lines 15A, 15B and 15C) is extended longer than the other two supporting lines 15B and 15C. Accordingly, since the structure is made such that a strength of the supporting line 15A is made lower than that of the other two supporting lines 15B and 15C, it is possible to first deflect the weak supporting line 15 prior to the other two supporting lines 15 only by pressing the holding body 14 from the above side so as to disperse the pressing force of the holding body 14. Therefore, it is possible to take out the holding body 14 from the inner portion of the center hole 18A of the disc 18 by a small pressing force, whereby it is possible to previously prevent the trouble that the disc 18 is broken due to the pressing force of the holding body 14 at a time of pressing the holding body 14 to the side of the main body 13.

In this case, in the embodiment, the strength of one supporting line 15A among the supporting lines 15A, 15B and 15C at three portions is structured to be lower, however, the structure is not limited to this, and the structure may be made such that the strength of the other supporting line 15B or 15C is made lower so as to disperse the pressing force of the holding body 14 at a time of pressing the holding body 14.

Further, the supporting lines 15A, 15B and 15C are provided at three portions in the holding body 14, however, the structure is not limited to this, and the structure may be made such that the supporting lines 15 are provided at two portions or three or more portions and a strength of the supporting line positioned in one side around the holding body 14 is made lower so as to disperse the pressing force of the holding body 14 at a time of pressing the holding body 14 to the side of the main body 13.

Further, the structure may be made such that the supporting lines 15 are radially arranged at four portions or four or more portions around the holding body 14 in an orthogonal manner and any one or a plurality of supporting lines in one side around the holding body 14 are cancelled so as to disperse the pressing force of the holding body 14 by the cancelled supporting lines at a time of pressing the holding body 14 to the side of the main body 13.

Further, the disc holding apparatus 10 is structured such as to hold the DVD, however, the structure is not limited to this, and it goes without saying that the disc holding apparatus 10 may hold the CD, the CD-R or the other high density recording medium disc.

Further, the sizes of the parts described in the embodiments are not limited to them, and it is of course possible to employ smaller sizes than those of the embodiments or larger sizes as far as the disc 18 can be easily attached to and detached from the holding apparatus in accordance with the present invention.

As in detailed described above, in accordance with the present invention, since there is provided the disc holding apparatus comprising, the main body, and the holding body provided within the main body for holding the information recording disc, protruded from the main body by the supporting lines having an elasticity, provided so as to move close to and apart from the main body and engaging with the center hole of the disc in such a manner as to put in and take out with respect to the inner portion of the center hole, in which the disc receiving portion for receiving the disc is provided so as to protrude from the main body at a time when the holding body moves close to the side of the main body, in the outer side of the holding body, it is possible to previously prevent the disc from being warped, for example, which is caused by the outer periphery of the disc being received by the disc receiver in accordance with the prior art, in the case of pressing the holding body in which the disc is held to the side of the main body. Accordingly, it is possible to securely prevent the warp, the breakage and the like in the disc. Therefore, it is possible to securely read out the information written on the disc.

Further, since the supporting lines are provided at a plurality of portions, and the strength of at least one of the supporting lines is structured such as to be lower than that of the other supporting lines, for example, in the case that the supporting lines are provided at three portions, and are radially extended in three directions around the holding body at a substantially uniform interval and the strength of any one supporting line of the supporting lines is made lower than that of the other two supporting lines, it is possible to disperse the pressing force of the holding body at a time of pressing the holding body inserted into the center hole of the disc to the side of the main body so as to take out from the inner portion of the center hole. Accordingly, it is possible to press the holding body by a light force. Therefore, it is possible to previously prevent the serious problems such that the disc is broken due to the pressing force of the holding body and the like, at a time of pressing the holding body firmly held within the center hole of the disc in the same manner as that of the prior art to the side of the main body so as to take out the holding body from the inner portion of the center hole.

Further, since the supporting line having the lower strength is structured such that the width or the thickness thereof is smaller than that of the other supporting lines, it is possible to first deflect the weak supporting line prior to the other two supporting lines only by pressing the holding body to the side of the main body. Accordingly, since it is possible to securely prevent the supporting lines extending in three directions from being tensioned in the center, it is possible to take out the holding body from the inner portion of the center hole of the disc in accordance with the small pressing force even in the case that the holding body is firmly held within the center hole of the disc. Accordingly, for example, even in the case that a vibration or an impact is applied to the disc receiving case in which the holding body is provided, it is possible to prevent a risk that the disc held in the holding body drops off from the holding body and the disc surface is damaged, so that it is possible to widely improve convenience of the disc holding apparatus.

Further, since the holding body has the disc holding lines protruding outward and having the elasticity, and the disc holding lines are engaged with the edge portion of the center hole in the opposite side to the main body in such a manner as to freely engage and disengage in a state that the holding body is inserted within the center hole of the disc and are deformed so as to be compressed inward when the holding body is pressed so as to move close to the direction of the main body, thereby allowing the holding body to pass through the inner portion of the center hole, it is possible to move the disc holding lines to the side of the main body from the edge portion of the center hole in the opposite side to the main body only by pressing the holding body to the side of the main body. Accordingly, it is possible to easily take out the holding body from the inner portion of the center hole of the disc. Therefore, it is possible to take out the holding body from the inner portion of the center hole of the disc in accordance with the extremely light pressing force on the sake of the dispersion of the pressing force of the holding body and the inward compression of the disc holding lines.

What is claimed is:

1. A disc holding apparatus having a main body to hold an information recording disc, comprising:

a plurality of supporting lines connected to the main body;

at least one supporting line connected to the main body wherein the supporting line has greater elasticity than the other supporting lines; and a holding body protruded from said main body by said supporting line, provided so as to move close to and apart from said main body and engaging with a center hole of said disc in such a manner as to put in and take out with respect to an inner portion of the center hole, wherein said holding body has a disc holding line protruding outward and having an elasticity, said disk holding line is engaged with an edge portion of the center hole in a side opposite to said main body in a state that said holding body is inserted into the center hole of said disc in such a manner as to freely engage and disengage, and is deformed in such a manner as to be compressed inward when said holding body is pressed so as to move close to said main body, thereby allowing said holding body to pass through said center hole.

2. A disc holding apparatus as claimed in claim 1, wherein at least one of said supporting lines has a strength lower than a strength of the other supporting lines.

3. A disc holding apparatus as claimed in claim 2, wherein said supporting line is provided at three portions, three supporting lines extend radially around said holding body in three directions at a substantially uniform interval, and at least one of said supporting lines has a strength lower than a strength of the other two supporting lines.

4. A disc holding apparatus as claimed in claim 2 or 3, wherein said supporting line having the lower strength is structured such that a width or a thickness thereof is smaller than that of the other two supporting lines.

5. A disc holding apparatus as claimed in claim 1, 2, 3 or 4, wherein a disc receiving portion for receiving said disc is provided so as to protrude from said main body at a time when said holding body moves close to a side of said main body, in an outer side of said holding body.

6. A disc holding apparatus as claimed in claim 1, 2 or 3, wherein said holding body has a disc holding line protruding outward and having an elasticity, said disc holding line is engaged with an edge portion of the center hole in a side opposite to said main body in a state that said holding body is inserted into the center hole of said disc in such a manner as to freely engage and disengage, and is deformed in such a manner as to be compressed inward when said holding body is pressed so as to move close to said main body, thereby allowing said holding body to pass through said center hole.

* * * * *